United States Patent [19]

Beller

[11] Patent Number: 4,583,085

[45] Date of Patent: Apr. 15, 1986

[54] LIQUID LEVEL SENSOR ASSEMBLY

[75] Inventor: Wilbert E. Beller, Park Ridge, Ill.

[73] Assignee: The Singer Company, Stamford, Conn.

[21] Appl. No.: 692,947

[22] Filed: Jan. 18, 1985

[51] Int. Cl.<sup>4</sup> ............................................. G08B 21/00
[52] U.S. Cl. ................... 340/618; 73/290 R; 340/59
[58] Field of Search .............. 340/618, 620, 615, 59; 73/290 R, 302; 116/227

[56] References Cited

U.S. PATENT DOCUMENTS

| 2,539,604 | 1/1951 | Woolley | 73/290 R |
|---|---|---|---|
| 2,624,790 | 1/1953 | White | 340/615 |
| 2,671,893 | 3/1954 | Van Scoy et al. | 340/618 X |
| 2,688,251 | 9/1954 | Kelly | 73/290 R |
| 2,717,991 | 9/1955 | Sherman | 340/618 |
| 2,720,784 | 10/1955 | Kelly | 73/290 X |
| 3,132,331 | 5/1964 | Boddy | 340/59 |
| 3,333,259 | 7/1967 | Carothers, Jr. | 340/59 |
| 3,636,510 | 1/1972 | Winfield | 340/59 |
| 3,667,295 | 6/1972 | Skutella | 73/290 R |
| 3,782,323 | 1/1974 | Jones | 73/302 X |
| 3,834,236 | 9/1974 | Durin | 73/302 |
| 4,417,232 | 11/1983 | Tewfik | 340/59 |
| 4,480,610 | 11/1984 | Stinson | 73/302 X |
| 4,506,258 | 3/1985 | Charboneau et al. | 340/618 |

*Primary Examiner*—James L. Rowland
*Assistant Examiner*—Daniel Myer
*Attorney, Agent, or Firm*—David L. Davis; Robert E. Smith; Edward L. Bell

[57] ABSTRACT

An oil level sensor assembly adapted for installation in an automobile engine crankcase at the level corresponding to "low oil". The sensor assembly utilizes the principle that air is expandable whereas oil is not. Accordingly, when it is desired to sense the oil level, a predetermined amount of fluid is trapped within a chamber sealed by a diaphragm. If the oil level is adequate, then the sensor will be below the oil level and the trapped fluid will be oil. However, if the oil level is low, the trapped fluid will be air. After the fluid is trapped, a spring operating on the diaphragm attempts to expand the chamber. If the admitted fluid is air, the chamber can be expanded and a switch contact will be made, to provide an indication of low oil level. On the other hand, if the chamber is filled with oil, the chamber will not expand and the switch contact will not be made.

10 Claims, 5 Drawing Figures

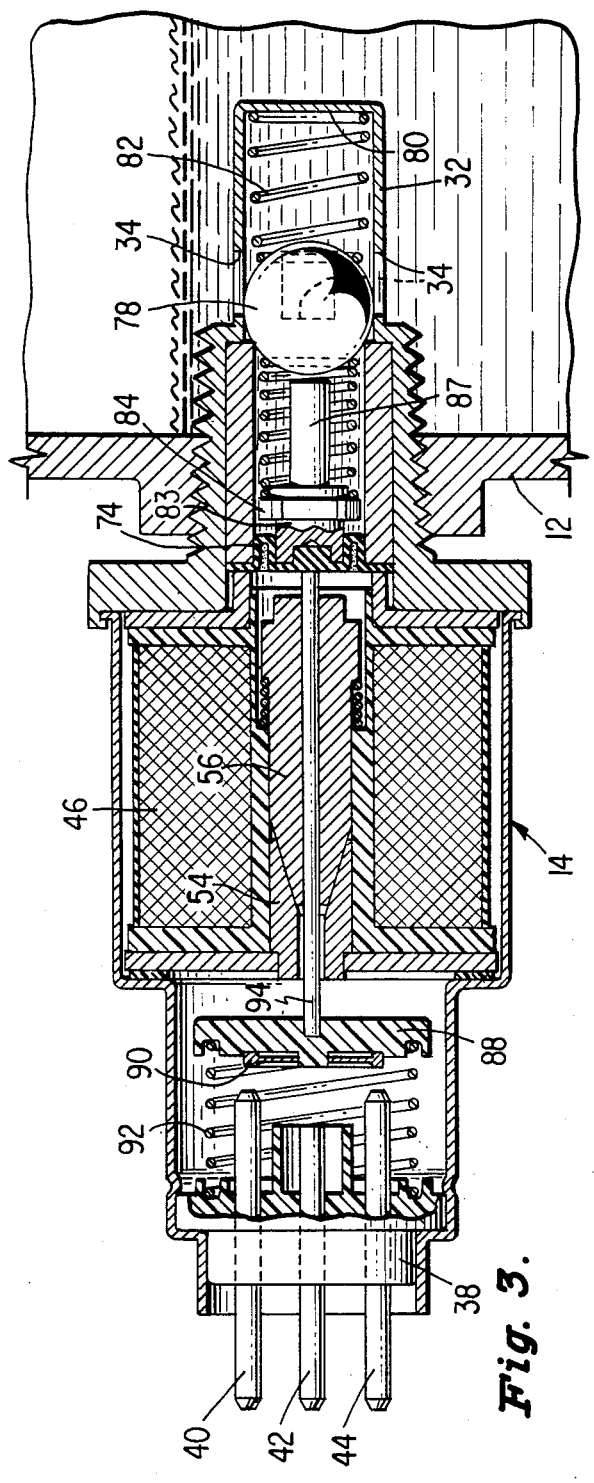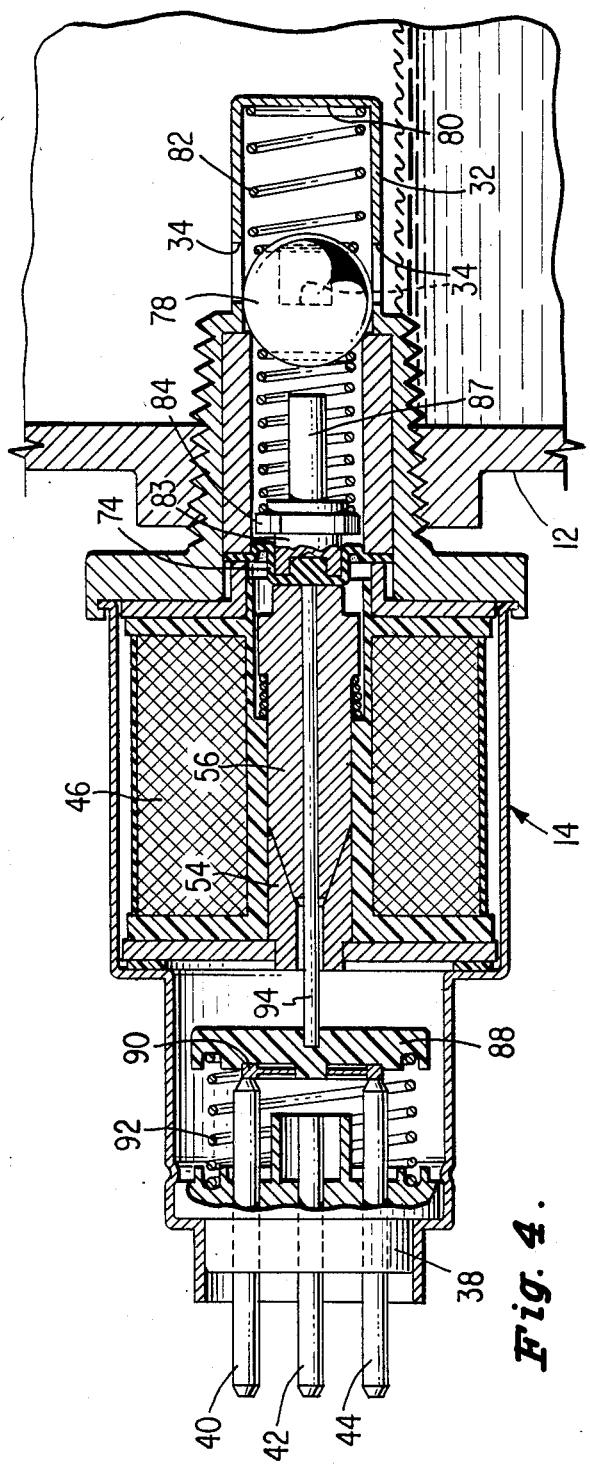

LIQUID LEVEL SENSOR ASSEMBLY

BACKGROUND OF THE INVENTION

This invention relates generally to apparatus for sensing and indicating the level of liquid in a container and, more particularly, to such apparatus for checking for a minimum acceptable liquid level such as, for example, the oil level in the crankcase of an automobile.

The necessity for maintaining minimum oil level in an engine crankcase to insure proper lubrication of the moving parts of an engine is notoriously well known. Maintaining a minimum level of transmission oil is perhaps even more critical, particularly in the case of automatic transmissions which can suffer devastating damage if driven for any distance with a low fluid level. The oil level in an engine crankcase or transmission is traditionally manually checked by means of a dipstick which extends through a tube into the oil reservoir, with the dipstick being manually removed to permit visual inspection of the calibrated oil level indicator scale thereon. The manually removable dipstick, while having been extensively utilized for many years, is nevertheless undesirable inasmuch as it requires direct access to the engine, which access is often rather difficult and unpleasant and hence there is a tendency to omit periodic checking of the oil level. This in turn can result in serious engine damage due to the engine being operated with inadequate quantities of oil for lubricating same. Additionally, for fleet operation carried out by bus lines, trucking companies and the like, in which these critical oil levels are checked on a somewhat routine basis, the cost in labor and time becomes substantial.

It is therefore a primary object of this invention to provide an arrangement for quickly and accurately checking for at least a minimum acceptable liquid level.

It is another object of this invention to provide such an arrangement which can be initiated from a remote location, such as the driver's seat of an automobile.

It is a further object of this invention to provide an arrangement which gives an indication as to whether the liquid level is acceptable, at a remote location such as the dashboard of an automobile.

With the recent advent of on-board microcomputers in an automobile which assumes the burden of providing diagnostic services, it would be desirable to have an oil level sensor assembly which could be "read" by the microcomputer. It is therefore still another object of this invention to provide such a sensor assembly.

SUMMARY OF THE INVENTION

The foregoing and additional objects are attained in accordance with the principles of this invention by providing an assembly for indicating when the level of liquid in a container is at or below a predetermined level, comprising a casing defining a chamber therein, means for mounting the casing on the container at the predetermined level, a resilient diaphragm sealing a first end of the chamber, a valve seat on the casing defining a second end of the chamber, means for providing fluid communication between the interior of the container at the predetermined level and the second end of the chamber, a valve member located at the second end of the chamber, means for biasing the valve member into engagement with the valve seat, a push member slidably movable in the chamber, means for biasing the push member away from the valve member and into engagement with the diaphragm, a movable actuator member outside the chamber, means for biasing the actuator member against the diaphragm to move the diaphragm into the chamber so as to move the push member against the valve member to unseat the valve member from the valve seat, whereby the chamber is filled with the fluid at the predetermined level in the container, means for moving the actuator member away from the diaphragm to allow the valve member to engage the valve seat and thereby entrap fluid within the chamber, and indicating means responsive to further movement of the diaphragm after the valve member has seated against the valve seat for providing an indication.

BRIEF DESCRIPTION OF THE DRAWINGS

The foregoing will be more readily apparent upon reading the following description in conjunction with the drawings in which like elements in different figures thereof have the same reference character applied thereto and wherein:

FIG. 3 is a longitudinal cross sectional view similar to FIG. 2 with the sensor assembly activated and the liquid level above the minimum acceptable level;

FIG. 4 is a longitudinal cross sectional view similar to FIG. 2 with the sensor assembly activated and the liquid level below the minimum acceptable level.

DETAILED DESCRIPTION

Figure 1:
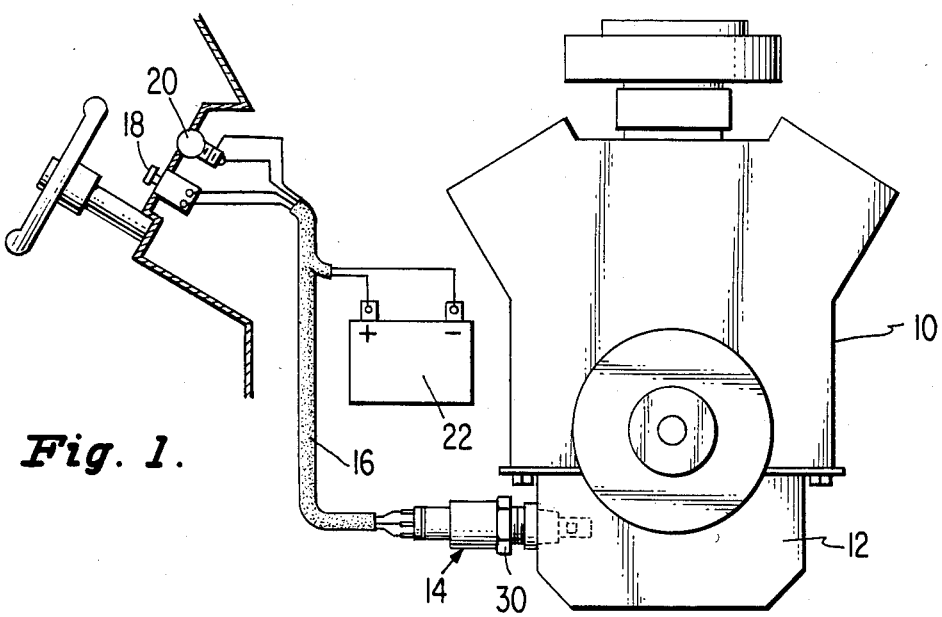
FIG. 1 schematically illustrates an installation in an automobile of an assembly constructed in accordance with the principles of this invention.

Referring now to the drawings, FIG. 1 schematically depicts an automobile engine 10 having an oil crankcase 12, the level of oil in which it is desired to monitor. Accordingly, a sensor assembly 14 is secured through the side of the crankcase 12 at the level corresponding to the minimum acceptable level of oil which it is desired to maintain. The sensor assembly 14 is connected via a wiring harness 16 to a switch 18 and an indicator lamp 20 mounted on the dashboard of the automobile, where they are accessible to the operator of the automobile. The wiring harness 16 is also connected to the automobile battery 22 for providing power for the sensor assembly 14 and the lamp 20, as will be described in full detail hereinafter.

Figure 2:
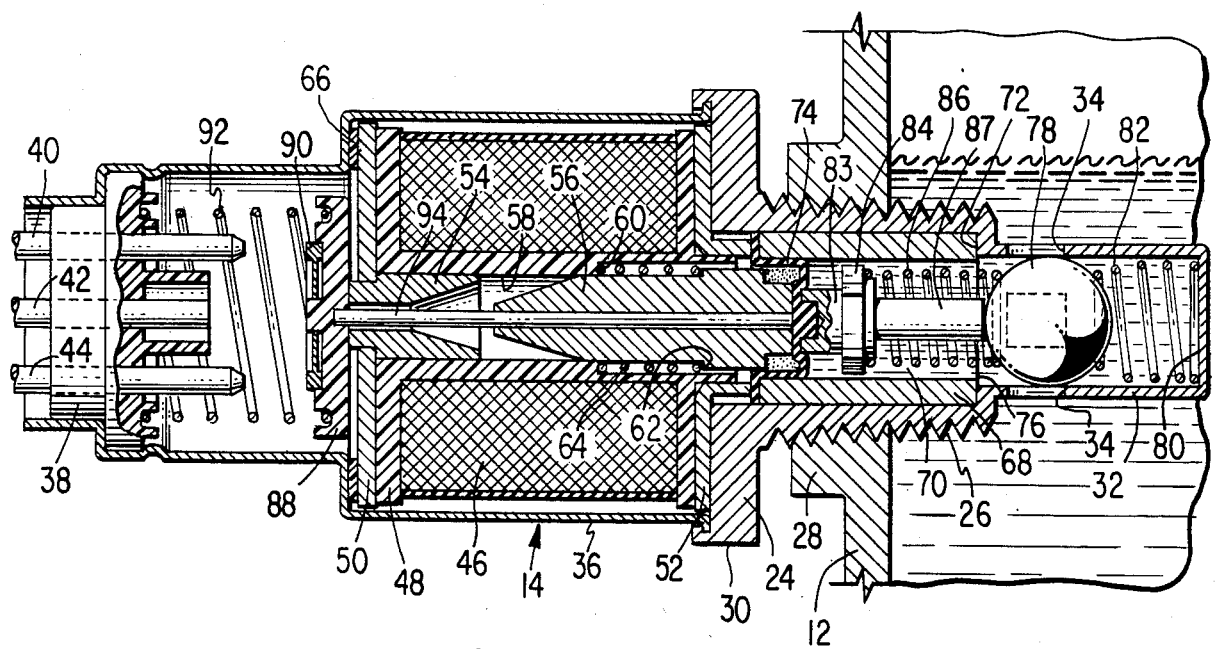
FIG. 2 is a longitudinal cross sectional view of a sensor assembly according to this invention in the "at rest" condition.

Referring now to FIG. 2, the sensor assembly 14 is seen to be formed with a housing 24 which has external threads 26. The crankcase 12 has an internally threaded boss 28 in which the housing 24 may be secured. For ease in securing the housing 24 to the crankcase 12, the housing 24 is formed with a hexagonally shaped region 30 (FIG. 1) which may be held by an installation wrench. The housing 24 is also formed with an extension 32 which extends into the crankcase 12. A plurality of openings, or ports, 34 in the extension 32 allow fluid communication from the interior of the crankcase 12 to the interior of the sensor assembly 14, as will be described hereinafter.

The sensor assembly 14 also includes a shell 36 to which the housing 24 is secured by crimping. The shell 36 is capped by a terminal assembly 38 which includes the terminal pins 40, 42 and 44. Within the shell 36 there is a solenoid which includes a coil 46 wound on a bobbin 48. The solenoid also includes a rear flux washer 50, a front flux washer 52, a pole piece 54 and an armature 56. The central bore 58 of the bobbin 48 is formed with a shoulder 60 and the armature 56 is formed with a shoulder 62. A helical compression spring 64 surrounding the armature 56 bears against the shoulders 60 and 62 to bias the armature 56 toward the right, as viewed in FIG. 2. A wave spring washer 66 holds the solenoid assembly tightly within in the shell 36.

The housing 24 contains the elements which actually perform the sensing function. Thus, within the housing 24 is a sleeve, or casing, 68 which defines a chamber 70 therein. The sleeve 68 is held at one side by an internal shoulder 72 of the housing 24 and at its other end by the front flux washer 52. A rolling type diaphragm 74 is captured between the front flux washer 52 and the sleeve 68 to seal a first end of the chamber 70. The inside corner 76 of the other end of the sleeve 68 forms a valve seat which cooperates with a valve member which preferably comprises the ball 78. The extension 32 of the housing 24 is formed with an end wall 80 and a compression spring 82 situated between the end wall 80 and the ball 78 biases the ball 78 toward the valve seat 76. The end wall 80 may be either open or closed and acts as a stop for the spring 82. A push member 83 is slidably movable within the chamber 70. The push member 83 has a shoulder region 84 which is fluted or otherwise open to allow fluid communication thereacross. The shoulder region 84 acts as a guide for the push member 83 within the chamber 70. A compression spring 86 surrounding the stem 87 of the push member 83, between the ball 78 and the shoulder region 84, biases the push member 83 away from the ball 78 and against the diaphragm 74. Thus, the push member 83 functions to transmit the force of the spring 86 to the diaphragm 74.

The indicator portion of the sensor assembly 14 cooperates with the terminal pins 40 and 44 to close a normally open circuit path under certain conditions, as will be described hereinafter. This indicator portion includes a contact pad 88 having mounted thereon a conductive contact disc 90 which is appropriately sized to be capable of simultaneously contacting both the pins 40 and 44. A compression spring 92 situated between the terminal assembly 38 and the contact pad 88 biases the contact pad 88 toward the right. A pin 94 fits into an appropriate opening provided therefor in the contact pad 88 and is trapped between the diaphragm 74 and the contact pad 88. Both the pole piece 54 and the armature 56 are formed with axial bores so that the pin 94 can extend therethrough and ride against the diaphragm 74.

The operation of the sensor assembly will now be described. This operation is based upon the principle that air is expandable whereas oil is not. Accordingly, when it is desired to sense the oil level, a predetermined amount of fluid is entrapped within the chamber 70. If the oil level is adequate, then the fluid will be oil and the chamber will not expand. However, if the oil level is low, the trapped fluid will be air. After the fluid is entrapped, the spring 86 attempts to move the push member 83 to move the diaphragm 74 so as to expand the chamber 70. If air was entrapped in the chamber 70, the chamber will expand. Contact will then be made between the terminal pins 40 and 44.

Specifically, as shown in FIG. 2, when the solenoid is not energized, the spring 64 moves the armature 56 outwardly from the coil 46 to the right and against the diaphragm 74. This also pushes the piston 84 against the ball 78, unseating the ball 78 from the valve seat 76. This allows fluid communication between the interior of the crankcase 12 and the chamber 70 by way of the ports 34. Thus, when the solenoid is not energized, whatever fluid is at the level of the sensor assembly 14 fills the chamber 70. For the condition shown in FIGS. 2 and 3, this fluid is oil. When it is desired to indicate the nature of the fluid at this level, the solenoid is energized by passing a direct current through the coil 46. Upon energization of the coil 46, the armature 56 is pulled inwardly of the coil 46 to the left until it is stopped by the pole piece 54. This condition is illustrated in FIG. 3. The armature 56 is thus out of contact with the diaphragm 74 and the spring 82 moves the ball 78 into contact with the valve seat 76, sealing the chamber 70 and trapping a quantity of fluid therein. The spring 86 then attempts to move the push member 83 and the diaphragm 74 to the left away from the ball 78. However, in order to move the diaphragm 74 to the left, the chamber 70 must be expanded. Since oil is not an expandable fluid, no such expansion of the chamber 70 can occur and travel of the diaphragm 74 to the left is limited.

Referring now to FIG. 4, if the oil level in the crankcase 12 is below the level of the sensor assembly 14, the sensor assembly 14 is exposed to air within the crankcase 12. Accordingly, air will be trapped within the chamber 70 when the solenoid is energized. Since air is an expandable fluid, the spring 86 can move the push member 83, and consequently the diaphragm 74, to the left to expand the chamber 70. When this occurs, the pin 94 is moved to the left. Moving the pin 94 to the left causes leftward movement of the contact pad 88 and the contact disc 90 until the contact disc 90 touches the terminal pins 40 and 44, thereby closing a normally open circuit path between the pins 40 and 44. This circuit path closure is utilized to provide an indication that the fluid level within the crankcase 12 is below a minimum acceptable level.

Figure 5:
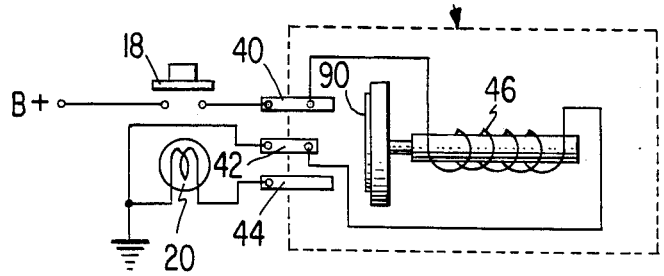
FIG. 5 is an electrical circuit schematic diagram for the sensor assembly according to the present invention illustrating one arrangement for initiating the sensing and indicating the results thereof.

FIG. 5 shows an illustrative electrical circuit schmatic diaphragm for use with the sensor assembly 14. As shown therein, the terminal pins 40 and 42 are connected across the coil 46. This connection is internal to the assembly 14. When the switch 18 is closed, current flows from the positive terminal of the battery 22 through the switch 18, through the terminal pin 40, through the coil 46, and through the terminal pin 42 to ground. If the oil level within the crankcase 12 is below the level of the sensor assembly 14, the contact pad 90 provide a circuit path between the terminal pins 40 and 44. Therefore, current also flows from the positive terminal of the battery 22, through the switch 18, through the terminal pin 40, through the contact pad 90, through the terminal pin 44, and through the lamp 22 to ground, thereby providing a visual indication of low oil level.

Other circuit configurations are possible. Thus, for example, the manual pushbutton switch 18 can be replaced by a switch coupled to the ignition starter switch so that whenever the engine is started, an oil level indication is provided. Alternatively, since many automobiles now contain on-board microcomputers, the sensor assembly 14 can be connected to the on-board microcomputer and the diagnostic routine of the microcomputer can include oil level sensing. Also, instead of the disclosed normally open circuit path, a normally closed circuit path could be provided.

Additionally, although a solenoid has been described as the actuating element, other actuators may be utilized. For example, a vacuum motor, a heat motor or a manual push/pull cable can control the armature 56.

The aforedescribed arrangement possesses a number of advantages. For example, at the time of sensing, the solenoid and the armature are free of the diaphragm and thus do not add a variable for which compensation must be provided. Additionally, when the oil level is above the minimum acceptable level, there is no movement of oil in or out of the sensing piston and contamination is virtually nonexistent, although a screen may be provided if desired.

Accordingly, there has been disclosed an oil level sensor assembly. It is understood that the abovedescribed embodiment is merely illustrative of the application of the principles of this invention. Numerous other embodiments may be devised by those skilled in the art without departing from the spirit and scope of this invention, as defined by the appended claims.

I claim:

1. An assembly for indicating when the level of liquid in a container is at or below a predetermined level, comprising:
    a casing defining a chamber therein;
    means for mounting said casing on said container at said predetermined level;
    a resilient diaphragm sealing a first end of said chamber;
    a valve seat on said casing defining a second end of said chamber;
    means for providing fluid communication between the interior of said container at said predetermined level and said second end of said chamber;
    a valve member located at said second end of said chamber;
    means for biasing said valve member into engagement with said valve seat;
    a push member slidably movable in said chamber;
    means for biasing said push member away from said valve member and into engagement with said diaphragm;
    a movable actuator member outside said chamber;
    means for biasing said actuator member against said diaphragm to move said diaphragm into said chamber so as to move said push member against said valve member to unseat said valve member from said valve seat, whereby said chamber is filled with the fluid at said predetermined level in said container;
    means for moving said actuator member away from said diaphragm to allow said valve member to engage said valve seat and thereby entrap fluid within said chamber; and
    indicating means responsive to further movement of said diaphragm after said valve member has seated against said valve seat for providing an indication.

2. The assembly according to claim 1 wherein said indicating means includes a switch coupled to said diaphragm, said switch being arranged to change state when said diaphragm moves a predetermined distance away from said valve seat.

3. The assembly according to claim 1 wherein said indicating means includes a circuit path normally in a first condition and means coupled to said diaphragm for changing the condition of said circuit path when said diaphragm moves a predetermined distance away from said valve seat.

4. The assembly according to claim 3 wherein said circuit path includes a pair of spaced apart conductive pins and said circuit path condition changing means includes a conductive member sized to be capable of simultaneously contacting both said conductive pins.

5. The assembly according to claim 4 wherein said circuit path is normally open and said circuit path condition changing means further includes means for biasing said conductive member away from said conductive pins and means coupling said conductive member to said diaphragm so that as said diaphragm moves away from said valve seat, said conductive member moves toward said conductive pins.

6. The assembly according to claim 5 wherein said actuator member is formed with a bore therethrough along its line of motion and said conductive member coupling means includes a pin extending through said bore.

7. The assembly according to claim 1 including a solenoid having a coil and an armature, wherein said armature functions as said actuator member and said coil functions as said means for moving said actuator member.

8. The assembly according to claim 1 wherein said mounting means includes an externally threaded housing surrounding said casing and threaded into an opening in said container, said housing having an extension which extends into said container beyond said second end of said chamber and having a stop opposite said second end of said chamber, said valve member being within said housing extension and said valve member biasing means comprising a compression spring positioned between said valve member and said stop.

9. The assembly according to claim 8 wherein said casing comprises a cylindrical sleeve and said valve member comprises a ball.

10. The assembly according to claim 8 wherein said means for providing fluid communication comprises at least one open port in said housing extension.

* * * * *